United States Patent
Mayinger

(10) Patent No.: US 11,371,647 B2
(45) Date of Patent: Jun. 28, 2022

(54) METHOD AND APPARATUS FOR ISOLATING A VIBRATION OF A POSITIONING DEVICE

(71) Applicant: Carl Zeiss Industrielle Messtechnik GmbH, Oberkochen (DE)

(72) Inventor: Philipp Mayinger, Aalen (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 159 days.

(21) Appl. No.: 16/805,617

(22) Filed: Feb. 28, 2020

(65) Prior Publication Data

US 2020/0278076 A1    Sep. 3, 2020

(30) Foreign Application Priority Data

Feb. 28, 2019 (DE) ..................... 10 2019 202 709.1

(51) Int. Cl.
| | |
|---|---|
| *F16F 15/00* | (2006.01) |
| *F16M 11/22* | (2006.01) |
| *B25J 19/00* | (2006.01) |
| *F16F 15/02* | (2006.01) |

(52) U.S. Cl.
CPC .......... *F16M 11/22* (2013.01); *B25J 19/0008* (2013.01); *F16F 15/002* (2013.01); *F16F 15/022* (2013.01); *F16M 2200/08* (2013.01)

(58) Field of Classification Search
None
See application file for complete search history.

(56) References Cited

U.S. PATENT DOCUMENTS

| | | | |
|---|---|---|---|
| 5,086,564 A | 2/1992 | Schalz | |
| 5,959,427 A * | 9/1999 | Watson | G03F 7/70725 318/687 |
| 6,021,991 A * | 2/2000 | Mayama | F16F 15/02 188/267 |
| 6,437,864 B1 * | 8/2002 | Watanabe | G03F 7/70716 355/53 |

(Continued)

FOREIGN PATENT DOCUMENTS

| | | |
|---|---|---|
| DE | 10229823 A1 | 1/2004 |
| EP | 1304499 A1 | 4/2003 |

(Continued)

OTHER PUBLICATIONS

Thomas Knickelmann, "Bei Wind und Wetter", 2020 Konrad Mediengruppe, KEM, Jan. 16, 2020 Germany and English language translation thereof.
Bilz, Active Isolation System AIS™ , Jan. 2020, Germany, and English language translation thereof.

(Continued)

*Primary Examiner* — Steven M Marsh
(74) *Attorney, Agent, or Firm* — Falk Ewers; Ewers IP Law PLLC

(57) ABSTRACT

A method and an apparatus for isolating a vibration of a positioning device are provided. The apparatus includes a base plate for the positioning device, at least one active bearing element for bearing the base plate on/at a foundation and at least one evaluation and control device. The apparatus includes at least one means for determining a foundation movement-dependent quantity, wherein the active bearing element is controllable by the at least one control and evaluation device on the basis of the foundation movement-dependent quantity.

11 Claims, 3 Drawing Sheets

(56) References Cited

U.S. PATENT DOCUMENTS

| | | | |
|---|---|---|---|
| 9,618,076 B2 | 4/2017 | Kropp et al. | |
| 10,184,539 B2* | 1/2019 | Kraner | F16F 7/1011 |
| 2007/0235276 A1* | 10/2007 | Heiland | G05D 19/02 |
| | | | 188/378 |
| 2007/0284794 A1* | 12/2007 | Heiland | G05D 19/02 |
| | | | 267/140.11 |
| 2009/0002715 A1 | 1/2009 | Goetz et al. | |
| 2010/0030384 A1* | 2/2010 | Kraner | F16F 15/02 |
| | | | 700/280 |
| 2010/0101906 A1* | 4/2010 | Herold | F16F 7/1011 |
| | | | 188/379 |
| 2012/0158191 A1* | 6/2012 | Rijnveld | G05D 19/02 |
| | | | 700/280 |
| 2012/0241268 A1* | 9/2012 | Laro | G03F 7/709 |
| | | | 188/379 |
| 2013/0180350 A1* | 7/2013 | Kraus | F16F 13/264 |
| | | | 74/108 |
| 2013/0328253 A1* | 12/2013 | Kraner | F16F 15/022 |
| | | | 267/140.14 |
| 2014/0007441 A1 | 1/2014 | Pettersson et al. | |
| 2018/0149473 A1 | 5/2018 | Sprenger et al. | |
| 2019/0383350 A1* | 12/2019 | Shikh | F16F 7/1011 |

FOREIGN PATENT DOCUMENTS

| | | |
|---|---|---|
| EP | 2505956 A1 | 10/2012 |
| EP | 2759735 A1 | 7/2014 |
| JP | 2004100953 A | 4/2004 |
| JP | 2009281533 A | 12/2009 |
| JP | 2015075909 A | 4/2015 |
| WO | 2016173625 A1 | 11/2016 |

OTHER PUBLICATIONS

Aktive Schwingungsisolation mit Piezoaktoren, Jan. 2020, Germany, and English language translation thereof.

Michael Gerhardy, Feder-Masse-Dampfer System, Jan. 2020, Germany, and English language translation thereof.

Steffen Arnold, Success Story—Schwingungsisolation für Industrie, Labor und Forschung, Jan. 2020, Germany, and English language translation thereof.

* cited by examiner

METHOD AND APPARATUS FOR ISOLATING A VIBRATION OF A POSITIONING DEVICE

CROSS REFERENCE TO RELATED APPLICATIONS

This application claims priority to German patent application DE 10 2019 202 709.1, filed Feb. 28, 2019, the entire content of which is incorporated herein by reference.

TECHNICAL FIELD

The disclosure relates to a method and an apparatus for isolating a vibration of a positioning device, and in particular to a coordinate measuring device.

BACKGROUND

Positioning devices, for example coordinate measuring machines or robots, may be fastened to a base plate which, on account of its high mass, serves for the vibration isolation of the positioning device in relation to so-called ground vibrations. This vibration isolation facilitates arranging the positioning device with as little movement as possible, as a result of which, in turn, a high positioning accuracy and, in the case of a coordinate measuring device, a high measurement accuracy, too, are facilitated.

The use of vibration isolators according to a spring-mass-damper principle is known. To this end, for the purposes of bearing the base plate on a foundation, for example a floor, a bearing element may include a damping element which is not regulated or controlled and a spring element which is not regulated or controlled. The effect of these elements together with the base plate forms the aforementioned spring-mass-damper element. In the case of coordinate measuring devices, it is usually desirable to tune the overall system in low-frequency fashion, in particular such that a vibration-isolating effect already occurs at low frequencies, e.g., frequencies that are larger than or equal to 3 Hz.

The use of active components for bearing a machine bed away from the ground is also known. EP 2 505 956 A1 states that active components can be used to decouple a measuring machine bed from the ground.

Further, the use of active spring elements in the field of coordinate measuring machines is known, which is described in DE 102 29 823 A1, for example. However, high masses of the base plate are required in order to meet the basic requirements of the employed air-spring elements. Consequently, it is possible to ensure that low natural frequencies are obtained.

Further, bearing elements that produce an anti-phase vibration in order to minimize local excitations are known. This may also be referred to as vibration compensation. WO 2016/173625 describes a method for dynamically compensating dynamic effects that occur during the movement of a measuring device.

SUMMARY

It is an object of the disclosure to provide a method and an apparatus for the vibration isolation of a positioning device, in particular a coordinate measuring device, which facilitate a reliable and, in terms of its properties, adjustable isolation of the positioning device from ground vibrations, with the weight of the apparatus being as low as possible.

The object is achieved by an apparatus for the vibration isolation of a positioning device and a method for the vibration isolation of a positioning device a described herein.

An apparatus for the vibration isolation of a positioning device is provided. The positioning device can serve for positioning a measuring device, for example a sensor, in particular a sensor with a probe head or an optical sensor, for producing measurement points. In this case, the positioning device can form, in particular, a coordinate measuring device or part of a coordinate measuring device. By way of example, this coordinate measuring device can be embodied in a so-called stand construction or so-called portal construction.

Alternatively, the positioning device may also serve to position a so-called end effector, for example a processing tool or a gripper. In this case, the positioning device can be embodied as a robot, for example a so-called articulated robot.

The positioning device facilitates a positioning of an object to be positioned, i.e., for example the end effector or the measuring device, in space with one or more degrees of freedom, e.g., 6 degrees of freedom.

In particular, a positioning device can be embodied such that positioning of the object to be positioned is facilitated with a momentum of larger than or equal to 100 mNs.

The vibration isolation in this case refers to an isolation of the positioning device from vibrations of the ground, on which the positioning device is mounted by way of the proposed apparatus. This may mean that vibrations of the ground are not transferred, or only transferred to a reduced, i.e., damped, extent, to the positioning device and hence to the object to be positioned. In the theoretical ideal case, this means that the object, to be positioned, of the positioning device does not carry out any movement when ground vibrations occur.

The apparatus includes a base plate for the positioning device. Here, the positioning device can be arranged on a surface of the base plate, more particularly fastened thereto or mounted thereon. Accordingly, the base plate may have or form appropriate arrangement means, for example fastening or bearing elements. Here, the base plate can be made of any desired material, for example granite, marble, ceramics, concrete, or glass. However, the base plate in the proposed apparatus may also be made of a different material, for example from a metal, e.g., iron, steel or titanium, from coated metals, e.g., nickel-coated or tungsten-coated metals, or else from non-metallic materials, e.g., from plastic, in particular fiber-reinforced plastic. In particular, it is conceivable to use materials which facilitate the manufacture of good surface flatness, which have a low Young's modulus and/or which have a small anisotropic coefficient of thermal expansion. It is likewise conceivable to use materials with honeycomb or foam structures.

Here, the base plate may also form part of the positioning device.

The term base plate does not necessarily set a slab-shaped embodiment of the base plate. Instead, the base plate may also adopt forms/embodiments that differ from a slab-shaped embodiment. The base plate may also be referred to as a machine bed or may be a machine bed.

Further, the apparatus includes at least one active bearing element for bearing the base plate on/at a foundation. The foundation can be the ground, for example soil, a floor or any other type of ground. Additionally, the foundation may be or include a wall. Consequently, the base plate may also include or form arrangement means, in particular fastening and/or bearing means, for the at least one active bearing element. The active bearing element, in turn, may have or form means for arrangement on/at the foundation.

Typically, the apparatus includes a plurality of active bearing elements, in particular three active bearing elements or more than three active bearing elements. These may be arranged in various regions on the base plate, with these then being mounted on/at the foundation by all bearing elements.

An active bearing element may consume power during operation, particularly electric power, which is taken from a power source, for example a power storage device or power supply network. A passive bearing element may consume no such power during operation.

In particular, an active bearing element may denote a controllable bearing element. This may mean that properties of the bearing element are adjustable by way of appropriate control signals.

The active bearing element may also include at least one actuator for producing a force and/or a movement of a movable part of the active bearing element. The actuator may include the movable part. Consequently, it is possible to set the force to be produced or at least one movement quantity of the movement to be produced, for example a displacement, a velocity or an acceleration.

Further, the apparatus includes at least one evaluation and control device. The latter can be embodied or include a computing device. A computing device, in turn, can be embodied as or include a microcontroller or an integrated circuit.

According to an aspect of the disclosure, the apparatus further includes at least one means for determining a foundation movement-dependent quantity. A foundation movement-dependent quantity denotes a quantity, in particular physical quantity, which is dependent on the foundation movement or characterizes the latter.

By way of example, the foundation movement-dependent quantity can be a foundation force, a foundation acceleration, a foundation velocity or a position of the foundation. In particular, the foundation movement-dependent quantity can be a quantity that is dependent on the relative movement between foundation and base plate.

Typically, the foundation movement-dependent quantity is the foundation acceleration. In particular, the latter can be directly detected or can be determined on the basis of one of the other foundation movement-dependent quantities.

The foundation force denotes a force with which the foundation acts on the apparatus, in particular the base plate and/or a positioning device arranged at the base plate. The foundation force can denote the force that is transferred from the foundation to the base plate via the at least one active bearing element. If a plurality of active bearing elements is present, it is also possible to determine foundation forces that differ from one another, specifically bearing element-specific foundation forces.

Within the meaning of this disclosure, the term force also includes a torque, in particular about a predetermined axis of the reference coordinate system.

Within the meaning of this disclosure, the term "determining" may denote a detection, in particular a direct detection, of a quantity. Thus, the means for determining the foundation movement-dependent quantity can be a means for detecting the foundation movement-dependent quantity, for example a force, acceleration, velocity or position sensor. In particular, piezoelectric sensors or MEMS-based sensors can be used as acceleration sensors. However, the term "determining" also denotes an exclusive or at least partial computational determination of a desired quantity. Thus, for example, the quantity to be determined can be determined on the basis of at least one quantity that differs from the quantity to be determined, for example by way of relationships known in advance, in particular functional relationships or mappings. The at least one different quantity can be detected in turn, in particular detected directly, or can be likewise determined computationally.

Thus, a model-based determination of the foundation movement-dependent quantity is also possible, wherein a model denotes, for example, a relationship between at least one input quantity that differs from the foundation movement-dependent quantity and the foundation movement-dependent quantity to be determined.

Additionally, the foundation movement-dependent quantity can thus be determined as movement quantity of a foundation movement or base plate movement, wherein the movement quantity may be detected, for example.

By way of example, it is possible to detect/determine the foundation movement-dependent quantity as a foundation acceleration or on the basis of the foundation acceleration and/or an acceleration of the base plate, for example by an acceleration sensor. Alternatively, a foundation velocity or a velocity of the base plate could be captured, for example by a velocity sensor, and the foundation movement-dependent quantity could then be determined on the basis of the foundation velocity or as foundation velocity. Further alternatively, a foundation displacement, i.e., a displacement of the foundation, could be determined and the foundation movement-dependent quantity could then be determined on the basis of, or as, this displacement. Additionally, the foundation acceleration could be determined, for example, on the basis of the foundation velocity or the foundation displacement, for example by way of suitable differentiation.

Here, the foundation force or a movement quantity of a foundation movement can be determined in a reference coordinate system, for example a global coordinate system. In particular, the global coordinate system can be a GNSS-based coordinate system.

The foundation movement-dependent quantity can be determined directly at the foundation, in particular at a mechanical interface between the foundation and the active bearing element, or on the basis of a quantity determined there. Additionally, the foundation movement-dependent quantity can be determined on the basis of a quantity that is determined at/in the base plate or at/in the positioning device. A model-based determination can be implemented in this case in particular, wherein the model used for determination purposes comprises a dynamic model of the apparatus and, optionally, of further components.

Further, the active bearing element is controllable on the basis of the foundation movement-dependent quantity by the at least one control and evaluation device. By way of example, the control and evaluation device can produce a control signal for the at least one active bearing element on the basis of the foundation force. In particular, the at least one control and evaluation device can actuate the active bearing element on the basis of the foundation movement-dependent quantity such that said active bearing element produces a force that is dependent on this quantity and/or sets a movement quantity that is dependent on this quantity. Here, it is possible, in particular, to set the direction and/or the strength of the force to be produced by the active bearing element and/or the direction and/or the absolute value of at least one movement quantity of the movement to be produced by the active bearing element.

To this end, methods for open-loop or closed-loop control that are known to a person skilled in the art can be used.

Thus, the control of the active bearing element on the basis of the foundation movement-dependent quantity can be carried out, in particular, by known open-loop or closed-loop control methods.

Controlling the active bearing element, in particular by setting the force to be produced and/or the movement quantity to be produced, allows a natural frequency and a damping behavior of the active bearing element to be set, in particular set to a target stiffness which may, for example, be determined in advance. This, in turn, allows a vibration transfer behavior of the active bearing element to be influenced and to be set as desired. By way of example, the stiffness of the bearing element can be set such that the bearing element has a desired limit frequency. By way of example, the active bearing element having a desired low-pass, high-pass or bandpass behavior during the transfer of vibrations from the foundation to the base plate may also be facilitated. Typically, the active bearing element is actuated such that the transfer behavior has a high-pass behavior with a limit frequency in the range of 0.1 Hz to 1.0 kHz. Additionally, the transfer behavior can be a band-stop behavior with limit frequencies from the aforementioned range.

Consequently, the control can influence the transfer behavior such that foundation vibrations are not transferred, or only transferred to a reduced extent, to the base plate and consequently to the positioning device, too. In turn, this advantageously facilitates a reliable vibration isolation, with vibration isolation meaning that vibrations are not transferred, or only transferred to a reduced extent, from the foundation to the base plate on account of the transfer behavior of the active bearing element.

Additionally, a vibration compensation can advantageously also be facilitated. Here, the active bearing element can be actuated, in particular, such that a vibration that is in anti-phase with the foundation vibration is produced. This may mean that a movable part of the active bearing element moves such that, despite foundation movement, the base plate is arranged in stationary fashion in the reference coordinate system explained above. In this case, movement quantities of the movement of the movable part of the actuator of the active bearing element, for example, can be set such that the movable part of the active element carries out a movement at the same frequency and with the same amplitude as the foundation, with the movement direction being set such that the above-described stationary arrangement of the base plate is achieved. Advantageously, this yields a further improved robustness of the vibration damping.

What advantageously emerges from this, in turn, is that the weight of the base plate can be reduced since the demands on the vibration-isolating properties are also reduced. If the base plate is part of the positioning device, the weight of the positioning device can also be reduced.

In a further exemplary embodiment, the active bearing element additionally includes a spring element, in particular a passive spring element. Alternatively or cumulatively, the active bearing element additionally includes at least one damping element, in particular a passive damping element. Here, a spring element may have predetermined spring properties, in particular a predetermined spring stiffness. Here, a damping element may have a predetermined damping constant, in particular constant damping constant.

Here, the spring element and/or the damping element and also the actuator of the active bearing element can be arranged mechanically in parallel fashion. However, other mechanical arrangements, in particular a mechanical series connection or a combination of series and parallel connections, of these elements are also conceivable.

The provision of an additional spring element and/or an additional damping element advantageously allows the active bearing element to absorb a static load through the base plate and, optionally, the positioning device without power being consumed during the static absorption. Advantageously, the provision of an additional damping element allows setting of a vibration transfer behavior of the bearing element in the non-activated state of the active bearing element, i.e., in a state without power consumption. What arises further in advantageous fashion is that the additionally mechanical damping by the spring element and/or the damping element needs to satisfy less stringent requirements than the case of an embodiment without an active bearing element, as a result of which installation space and production costs can advantageously be saved for the spring and/or damping element.

In a further exemplary embodiment, the apparatus includes at least one means for determining or detecting a base plate movement-dependent quantity.

Here, the base plate movement-dependent quantity denotes a quantity, in particular physical quantity, which is dependent on the movement of the base plate or characterizes the latter.

By way of example, the base plate movement-dependent quantity can be a base plate force, a base plate acceleration, a base plate velocity or a position of the base plates. Here, in particular, the base plate movement-dependent quantity can be a quantity that is dependent on the relative movement between base plate and foundation.

Here, the base plate force can denote a force that acts from the base plate on the foundation via the active bearing element. In accordance with the preceding explanations in respect of the means for determining the foundation movement-dependent quantity, the means for determining the base plate movement-dependent quantity may also be realized in various forms. By way of example, the base plate force can thus be determined on the basis of a movement quantity of the movement of the base plate, wherein the movement quantity may be detected or likewise be determined. Additionally, one of the specified base plate movement-dependent quantities may be determined on the basis of a further base plate movement-dependent quantity that differs therefrom.

Alternatively or cumulatively, the apparatus includes at least one means for determining an inherent movement-dependent quantity of the positioning device. Here, the inherent movement-dependent quantity of the positioning device denotes a quantity, in particular physical quantity, which is dependent on the inherent movement of the positioning device, e.g., caused thereby, or characterizes the latter.

By way of example, the inherent movement-dependent quantity could be a positioning device force arising during the movement of a movable part of the positioning device, an acceleration, a velocity or a position of a movable part of the positioning device during an inherent movement of the positioning device, which will still be explained in more detail below. Here, in particular, the inherent movement-dependent quantity can be a quantity that is dependent on the relative movement between positioning device and base plate.

Here, the positioning device force denotes a force that is transferred from the positioning device to the foundation via the base plate and the active bearing element and it is consequently also transferred via the active bearing element.

This positioning device force may lead to disturbing movements if vibration isolation in the corresponding frequency range is not set to be sufficiently isolating or compensating.

The positioning device force may denote the totality of a (static) weight and a dynamic force of the positioning device or else only denote the dynamic force that is transferred from the positioning device to the foundation via the base plate and the active bearing element. A dynamic force denotes a force resulting from the inherent movement of the positioning device.

In accordance with the preceding explanations in respect of the exemplary embodiment of a means for determining the foundation movement-dependent quantity, the means for determining the inherent movement-dependent quantity may also be realized in various exemplary embodiments. Thus, the inherent movement-dependent quantity may be determined, for example, as one of the specified inherent movement-dependent quantities or as a function of a further, different inherent movement-dependent quantity of the inherent movement of the positioning device, wherein the latter quantity may be detected or likewise determined.

The positioning device force may denote a force that differs from the weight of the positioning device. In particular, the positioning device force may be produced by an inherent movement of the positioning device. The inherent movement denotes a movement that is produced by at least one drive device of the positioning device. This drive device differs from the active bearing element. The inherent movement can be a movement of a movable part of the positioning device, for example of a joint or of the object to be positioned. Here, the movement quantity of the base plate movement and of the inherent movement of the positioning device may be determined in the aforementioned reference coordinate system.

Further, the active bearing element is additionally controllable on the basis of the base plate movement-dependent quantity and/or the inherent movement-dependent quantity of the positioning device by the at least one control and evaluation device.

Here, the inherent movement-dependent quantity can be detected directly, e.g., using a sensor, or can be determined, for example on the basis of a model. Here, the control and evaluation device can be data and/or signal connected to at least one means for determining the movement quantity.

By way of example, the positioning device force, explained above, and/or the base plate movement-dependent quantity, explained above, can be determined on the basis of the determined inherent movement-dependent quantity. Then, the active bearing element can be actuated such that the base plate force and/or the force transferred to the active bearing element from the positioning device via the base plate and/or the positioning device force is compensated. In particular, the force exerted by the active bearing element on the base plate consequently can compensate the positioning device force.

It is also possible to determine at least one movement quantity of the base plate, e.g., on the basis of the base plate movement-dependent quantity and/or the inherent movement-dependent quantity, and actuate the active bearing element such that the actual movement of the base plate is prevented or reduced to a desired extent.

Expressed differently, a movement of the base plate caused by the movement of the positioning device, in particular of an object to be positioned, can be determined. Then, the active bearing element, in particular a movable part of the active bearing element, can be actuated such that this movement of the base plate induced by the positioning device is reduced or eliminated.

What advantageously arises as a result thereof is that vibrations of the base plate induced by an inherent movement of the positioning device can also be reliably eliminated or reduced. In turn, this advantageously improves the positioning or measurement accuracy of the positioning device.

Expressed differently, effects of an inherent movement of the positioning device on a position and/or orientation of the base plate can be reduced. Thus, particularly in the case of low masses of the base plate, the inherent movement of the positioning device may cause unwanted movements of the base plate, in particular at frequencies in the range of the resonant frequency of the resultant mechanical system. This effect can advantageously be avoided by the proposed control of the active bearing element.

In an exemplary embodiment, the inherent movement-dependent quantity is determined on the basis of a model. In particular, the model can be a relationship between a movement quantity of the positioning device, in particular a movement quantity of the object to be positioned, and the positioning device force, which was explained above. The model may also be a relationship between control signals for setting a movement quantity of the inherent movement of the positioning device and the positioning device force.

Here, the at least one movement quantity can be determined or detected. Consequently, the inherent movement-dependent quantity, in particular the positioning device force, can thus be determined on the basis of an implemented inherent movement of the positioning device or a target inherent movement of the positioning device and the at least one active bearing element can be actuated accordingly.

Naturally, the model may also describe a relationship between additional properties of the positioning device and/or of the object to be positioned, e.g., a weight. In this case, the positioning device force may additionally be determined on the basis of these properties, too. This facilitates the use of base plates with a low mass. This can reduce installation space and production costs for the apparatus.

In a further exemplary embodiment, a maximum producible force of the active bearing element is larger than 100 N. As a result, in terms of absolute value, significant foundation forces and/or positioning device forces, and hence also the movement of the base plate resulting therefrom, can be compensated and, consequently, for example high accelerations of the positioning device are also possible. What arises furthermore is that an upper limit frequency of the vibration isolation and compensation increases with a higher maximum producible force and a desired vibration isolation and compensation is consequently possible in the exemplary embodiment. Alternatively or cumulatively, a dynamical property of the active bearing element is larger than 50 Hz, in particular larger than 100 Hz. Here, the dynamical property may denote the frequency with which a movable element of the active bearing element can be moved with a predetermined amplitude, for example in the amount of What advantageously arises as a result thereof is that floor vibrations and possibly also movements of the base plate caused by the inherent movement of the positioning device can be reliably isolated or compensated.

Further alternatively or cumulatively, damping provided by the active bearing element is larger than 50% for frequencies of less than 10 Hz. Thus, the active bearing element may be embodied, arranged and/or actuated such that an amplitude of the movement of the base plate, caused by the foundation vibration with a frequency of less than 10 Hz, with the active bearing element is more than 50% less than without the active bearing element, particularly in the case of a rigid coupling between foundation and base plate.

In an exemplary embodiment, the active bearing element includes a piezo actuator. As a result, a reliable and cost-effective exemplary embodiment of the proposed apparatus emerges in an advantageous manner. Alternatively, the active bearing element includes an electromagnetic actuator. Further alternatively, the active bearing element includes a capacitive actuator. As a result, a simple and cost-effective exemplary embodiment of the actuator likewise emerges in an advantageous manner.

Further, it would be possible for the set of bearing elements, by which the base plate is mounted on the foundation, not to include an air bearing element.

In a further exemplary embodiment, the active bearing element includes at least one position detection device. The position detection device can be used, in particular, to detect a current position of a movable part of the active bearing element, in particular of the actuator. In addition to the inherent movement caused by the actuator of the active bearing element, such a position detection device can also determine an externally caused movement of the movable part, for example a movement of the movable part caused by floor vibrations or base plate movements. Advantageously, this facilitates the detection of current vibrations in the system, in particular so-called residual vibrations.

Further, the active bearing element could be controlled on the basis of the position or change in position detected by the position detection device of the active bearing element, in particular in order to reduce or eliminate the aforementioned residual vibrations. This yields a further improved reduction of vibrations and hence this consequently also yields an improved positioning or measurement accuracy.

The apparatus includes at least three active bearing elements in a further exemplary embodiment. This has already been explained above. As a result, even torsional vibrations, in particular torsional vibrations or movements of the base plate, caused by an inherent movement of the positioning device, can be eliminated or at least reduced by an appropriately controlled or regulated operation of the at least three active bearing elements.

Further, the proposed apparatus could include a plurality of active bearing elements, with these being embodied and/or arranged such that there can be a reduction or elimination of unwanted movements, in particular vibrations of the base plate (and hence of the positioning device), exclusively along or parallel to exactly one spatial direction or along or parallel to a plurality of independent spatial directions, in particular two or three linearly independent spatial directions. Thus, for example, the reference coordinate system explained above could be a Cartesian coordinate system with a vertical axis (z axis) being oriented parallel and counter to the direction of a gravitational force. A longitudinal axis and a transverse axis (x axis, y axis) can then span a plane oriented perpendicular to the vertical axis. In this case, the at least one active bearing element can be arranged and/or embodied such that there can be a reduction or elimination of only unwanted movements/vibrations along exactly one of the aforementioned axes, in particular along the vertical axis. However, a plurality of active bearing elements could also be arranged and/or embodied such that there can be a reduction or elimination of unwanted movements/vibrations along exactly two axes or along exactly the aforementioned axes. Further, the active bearing elements could be arranged and/or embodied such that there can be a reduction or elimination of unwanted rotational movements/torsional vibrations about exactly one of the aforementioned axes, in particular about the vertical axis, or about exactly two or exactly three of the aforementioned axes.

As a result, a reliable and improved stabilization in the position of the base plate emerges in an advantageous manner.

If the apparatus includes a plurality of active bearing elements, there can be a bearing element-specific determination of the foundation movement-dependent quantity. This means that the foundation movement-dependent quantity that is transferred to the base plate by the specific active bearing element is determined. Accordingly, there can be a bearing element-specific determination of a base plate movement-dependent quantity and/or an inherent movement-dependent quantity of the positioning device. There can also be a bearing element-specific determination of a movement quantity of the foundation, the base plate and/or the positioning device. This may mean that there is a determination of the movement quantity of a movement of a portion on which the active bearing element is arranged. Then, the active bearing element can be controlled on the basis of these bearing element-specific quantities.

Further, an arrangement of a positioning device and an apparatus for vibration isolation as per one of the exemplary embodiments described in this disclosure is provided. Here, the positioning device is mounted on or at the base plate of the apparatus.

Further, a method for the vibration isolation of a positioning device by an apparatus for vibration isolation as per one of the exemplary embodiments described in this disclosure is described. In the process, a foundation movement-dependent quantity is determined. Further, the active bearing element is controlled on the basis of the foundation movement-dependent quantity. Consequently, the apparatus described in this disclosure is configured such that the described method is able to be carried out by the apparatus.

In particular, the active bearing element, in particular an actuator of the active bearing element, can be controlled such that a movement of the base plate (and hence also of the positioning device) that is caused by the foundation movement-dependent quantity is reduced or completely eliminated. It is also possible to control the active bearing element on the basis of a movement quantity of a foundation movement.

As explained above, the active bearing element could additionally also be controlled on the basis of a base plate movement-dependent quantity and/or an inherent movement-dependent quantity of the positioning device and/or on the basis of a movement quantity of the movement of the base plate and/or on the basis of a movement quantity of the inherent movement of the positioning device and/or on the basis of a position detected by a position detection device of the active bearing element. In particular, the active bearing element can then be controlled such that unwanted movements, in particular vibrations, are reduced or completely eliminated. If the active bearing element is additionally controlled on the basis of the inherent movement-dependent quantity, said active bearing element can be controlled, in particular, such that a movement of the base plate that is caused by an inherent movement of the positioning device is reduced or completely eliminated.

BRIEF DESCRIPTION OF THE DRAWINGS

The disclosure will now be described with reference to the drawings wherein.

DESCRIPTION OF EXEMPLARY EMBODIMENTS

Identical reference signs hereinafter designate elements having identical or similar technical features.

Figure 1:
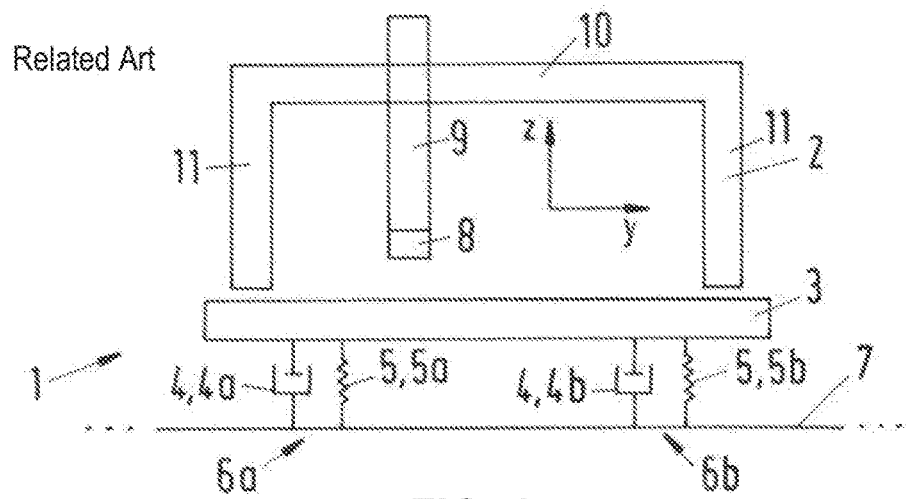
FIG. 1 shows a schematic view of an apparatus for vibration isolation including a positioning device according to the related art.

FIG. 1 shows an apparatus 1 for the vibration isolation of a positioning device, embodied as a coordinate measuring device 2, according to the related art. This apparatus 1 includes a base plate 3, which may be embodied as a granite slab, for example. Further, the apparatus 1 includes passive damping elements 4 and passive spring elements 5, which are arranged mechanically parallel to one another. A first damping element 4a and a first spring element 5a form a first passive bearing element 6a. Accordingly, a second damping element 4b and a second spring element 5b form a second passive bearing element 6b, with the base plate 3 being mechanically connected to a foundation 7 via the bearing elements 6a and 6b. In particular, the base plate 3 is mounted on the foundation 7 via the bearing elements 6a and 6b. A reference coordinate system with a vertical axis z and a transverse axis y is illustrated. A longitudinal axis x, which is oriented at right angles to the vertical axis z and to the transverse axis y, is not illustrated. The vertical axis z is oriented parallel and counter to the direction of a gravitational force. The coordinate measuring device 2 is a coordinate measuring device 2 with a portal-type exemplary embodiment, with movable parts of this positioning device 2 serving for the spatial positioning of a measuring device 8, which is fastened to a quill 9 of the coordinate measuring device 2. The measuring device 8 may include an optical or tactile sensor for producing measurement points for measuring a test object. Further, a cross beam 10 is illustrated, wherein the quill 9 can be moved along the cross beam 10 in the transverse direction y. Further, the measuring device 8 can be moved along the quill 9 in the vertical direction in order to position the measuring device 8. Stand elements 11, on which the cross beam 10 is mounted, can be moved in this case along the longitudinal direction, which is not illustrated here.

An inherent movement of this positioning device may therefore include a movement of these movable parts along the explained spatial axes.

Figure 2:
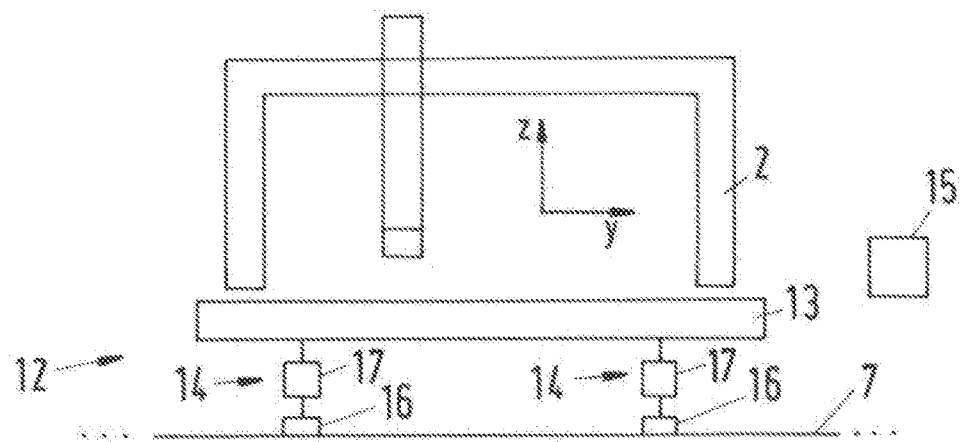
FIG. 2 shows a schematic view of an apparatus including a positioning device according to an exemplary embodiment of the disclosure.

FIG. 2 shows an apparatus 12 according to an exemplary embodiment of the disclosure including a positioning device embodied as a coordinate measuring device 2. Here, the coordinate measuring device 2 is embodied like the coordinate measuring device 2 illustrated in FIG. 1. Therefore, reference is made to the corresponding explanations in relation to FIG. 1. The apparatus 12 includes a base plate 13. By way of example, the latter can be embodied as a granite slab. However, this is not mandatory. By way of example, it would also be conceivable for material that is lighter than granite to be used for the purposes of forming the base plate 13, for example a metal or plastic. Further, the apparatus 12 includes active bearing elements 14, the base plate 13 being mounted on a foundation 7 via these active bearing elements 14. Here, an active bearing element 14 may include an actuator 17, in particular a piezo actuator. In turn, the actuator 17 may include at least one movable part. Here, a desired output force could be set by the actuator 17 and/or a desired movement of the movable part of the actuator 17 could be set, e.g., by actuating the actuator by appropriate control signals. This can be implemented by a control and evaluation device 15 of the apparatus 12 according to an exemplary embodiment of the disclosure, which can appropriately actuate the active bearing elements 14, and hence also the actuators 17 thereof. Further, the apparatus 12 includes means, embodied as acceleration sensors 16, for determining a foundation movement-dependent quantity, specifically a foundation acceleration. A foundation force acts on account of the foundation acceleration, wherein the foundation force denotes the force transferred from the foundation 7 to the base plate 13 via the active bearing elements 14. The exemplary embodiment of the means for determining the foundation force as acceleration sensors 16 is only exemplary here. Additionally, the means for determining the foundation movement-dependent quantity may include means for determining or detecting the foundation force or a further movement quantity of a foundation movement, for example a position sensor, velocity sensor or force sensor. Further, the means for determining the foundation movement-dependent quantity may then include an evaluation device for determining the foundation movement-dependent quantity on the basis of the movement quantity. By way of example, this may be formed by the control and evaluation device 15.

The means for determining the foundation movement-dependent quantity or an aforementioned sensor may be arranged on a foundation-side end of the active bearing element 14, in particular if the means is embodied as an acceleration sensor or includes the latter.

However, the means for determining the foundation movement-dependent quantity could also be arranged elsewhere, for example at a base plate-side end of the active bearing element 14, in particular if the means is embodied as a force sensor or includes the latter. The means could also be arranged at the positioning device or at the measuring device. In this case, the foundation movement-dependent quantity can be determined in particular by way of a model of the positioning device, e.g., a mechanical or dynamic model.

In particular, the control and evaluation device 15 can be data and/or signal connected to the active bearing elements 14 and to the force sensors 16.

The control and evaluation device 15 allows the active bearing elements 14 to be controlled on the basis of the determined foundation movement-dependent quantity. In particular, a force of the actuator and/or at least one movement quantity of a movement of the movable part of the actuator 17 can be set by way of the control and evaluation device 15.

In particular, the output force of the actuator 17 of the active bearing element 14 and/or the at least one movement quantity of the movement of the movable part can be set such that movement of the base plate 13 caused by a movement of the foundation 7 is reduced or completely eliminated.

The control and evaluation device 15 can also be used to actuate the active bearing elements 14 on the basis of a movement quantity of the foundation movement, in particular such that the movement of the base plate 13 caused by the foundation movement is reduced or completely eliminated.

Figure 3:
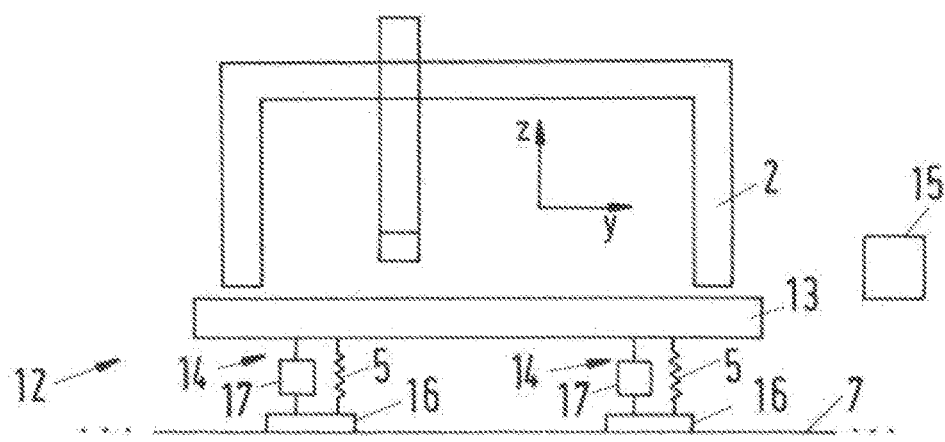
FIG. 3 shows a schematic view of an apparatus including a positioning device according to a further exemplary embodiment of the disclosure.

FIG. 3 shows a schematic view of an apparatus 12 according to an exemplary embodiment of the disclosure including a positioning device 2, the latter being embodied in a manner corresponding to the exemplary embodiment of the positioning device 2 illustrated in FIG. 1. In contrast to the exemplary embodiment of the apparatus 12 shown in FIG. 2, an active bearing element 14 includes a (passive) spring element 5 in addition to the actuator 17, said spring element being arranged mechanically parallel to the actuator 17 of the corresponding active bearing element 14. Thus, in particular, the base plate 13 is mounted on the foundation 7 via active bearing elements 14, which includes spring elements 5 and actuators 17 arranged in mechanically parallel fashion.

Figure 4:
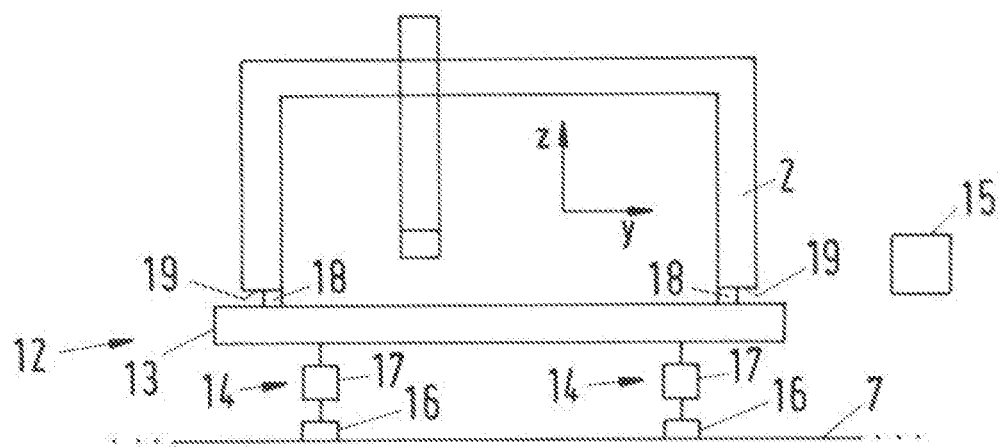
FIG. 4 shows a schematic view of an apparatus including a positioning device according to a further exemplary embodiment of the disclosure.

FIG. 4 shows an apparatus 12 for vibration isolation according to a further exemplary embodiment including a positioning device 2, the latter embodied in accordance with the exemplary embodiment shown in FIG. 1. In contrast to the exemplary embodiment of the apparatus 12 shown in FIG. 2, the apparatus 12 includes means, embodied as force sensors 18, for detecting a positioning device force, the positioning device force denoting a force that is exerted by the positioning device 2 on the base plate 13 or is transmitted from said positioning device to said base plate. In particular, the positioning device force denotes a force that is produced by an inherent movement of the positioning device 2 and that acts on the base plate 13. Here, this inherent movement denotes a movement of a movable part of the positioning device 2 or a movement of an object to be positioned, e.g., the aforementioned measuring device 8.

The exemplary embodiment of the means for determining a positioning device force as force sensors 18 is purely exemplary here. Naturally, the positioning device force could be determined differently. By way of example, the positioning device force can be determined on the basis of at least one movement quantity of a movement of a movable part of the positioning device 2, for example a movement of the measuring device 8. By way of example, such a movement quantity can be detected, e.g., by a sensor. Such a movement quantity could also be determined, in particular in computational fashion. Further, the latter can then be determined on the basis of a predetermined relationship between the at least one movement quantity and the positioning device force. In particular, this relationship can be based on a model.

FIG. 4 shows force sensor 18 arranged between the base of a stand 19 and a surface of the base plate 13. Additionally, a means, in particular a sensor, for determining a movement quantity of a relative movement between bases of stands 19 of the positioning device 2 and the base plate 13 could be arranged there and the positioning device force could then be determined on the basis of this movement quantity. By way of example, if the bases of the stands 19 are air-mounted at the base plate 13, the sensor could be or include, for example, an air pressure sensor or distance sensor for detecting a width of the air gap, wherein the positioning device force can be determined on the basis of the air pressure or the width.

More generally, a movement quantity of a relative movement between the positioning device-side bearing portion for mounting the positioning device 2 on the base plate 13 and the base plate 13 can be determined, with the positioning device force then being determined on the basis of this relative movement.

The positioning device force forms an inherent movement-dependent quantity of the inherent movement of the positioning device 2. In general, the apparatus 12 could also include means for detecting an inherent movement-dependent quantity, the latter possibly being, e.g., a positioning device acceleration, velocity or displacement/position.

Then, as explained above, the active bearing elements 14 can be actuated on the basis of the positioning device force or the aforementioned inherent movement-dependent quantity. Alternatively, the active bearing elements 14 could also be controlled on the basis of a movement quantity of the aforementioned relative movement or of the inherent movement of the positioning device 2 or the base plate 13.

Figure 5:
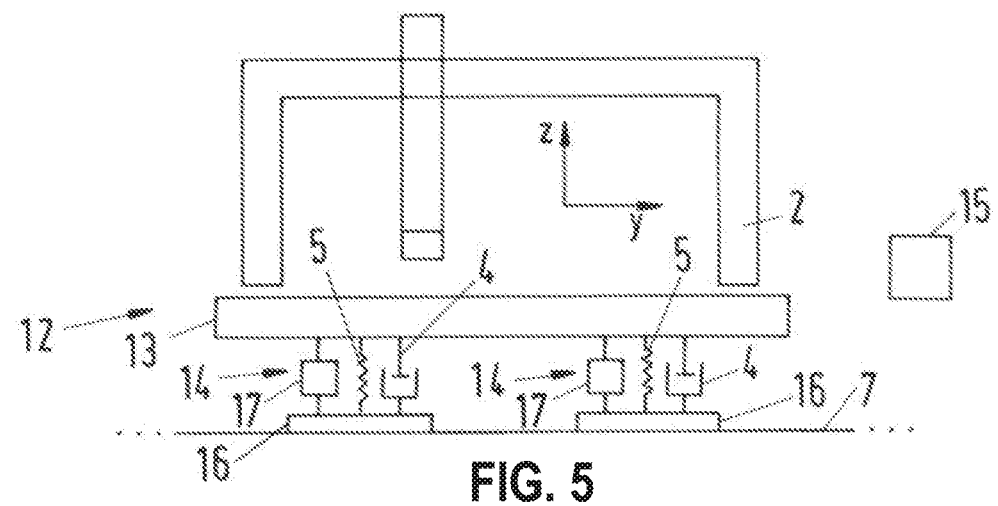
FIG. 5 shows a schematic view of an apparatus including a positioning device according to a further exemplary embodiment of the disclosure.

FIG. 5 shows a schematic view of an apparatus 12 according to a further exemplary embodiment including a positioning device 2, the latter being embodied in a manner corresponding to the positioning device 2 shown in FIG. 1. In contrast to the apparatus 12 shown in FIG. 3, an active bearing element 14 includes a passive damping element 4 in addition to an actuator 17 and a passive spring element 5, the passive damping element being arranged mechanically parallel to the actuator 17.

Figure 6:
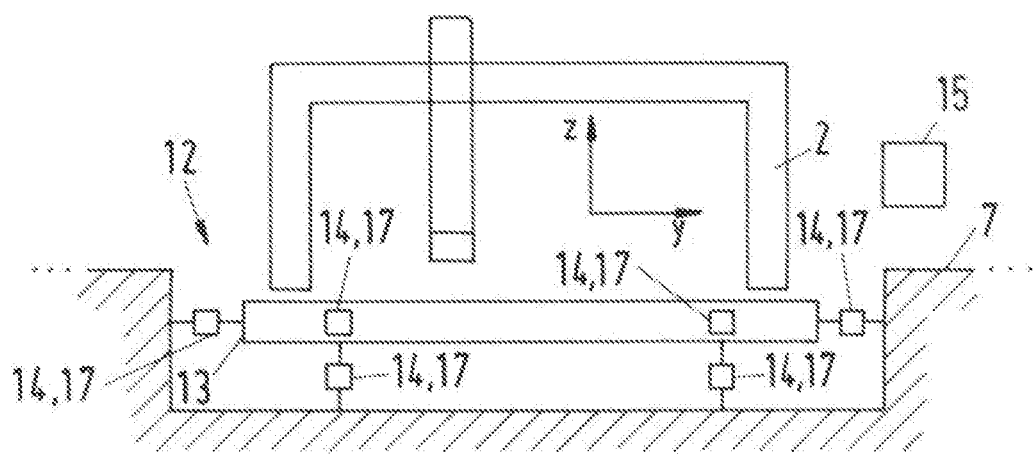
FIG. 6 shows a schematic view of an apparatus including a positioning device according to a further exemplary embodiment of the disclosure.

FIG. 6 shows a schematic illustration of an apparatus 12 according to a further exemplary embodiment including a positioning device 2, the latter being embodied according to the embodiment illustrated in FIG. 1.

What is shown here is that the base plate 13 is mounted on/at a foundation 7 via a multiplicity of active bearing elements 14. In particular, a lower side of the base plate 13 is mounted on the foundation 7 via active bearing elements 14. The positioning device 2 is mounted on an upper side of the base plate. Further, side surfaces, i.e., longitudinal and transverse sides, of the base plate 13 are mounted on the foundation 7 via further active bearing elements 14. This facilitates the reduction or complete elimination of movements of the base plate 13, even along spatial axes that differ from the vertical axis z, in particular along the longitudinal axis and/or the transverse axis y. Additionally, unwanted rotational movements of the base plate 13, which are caused by the inherent movement of the positioning device 2 and/or by the foundation movement, can be reduced.

Figure 7:
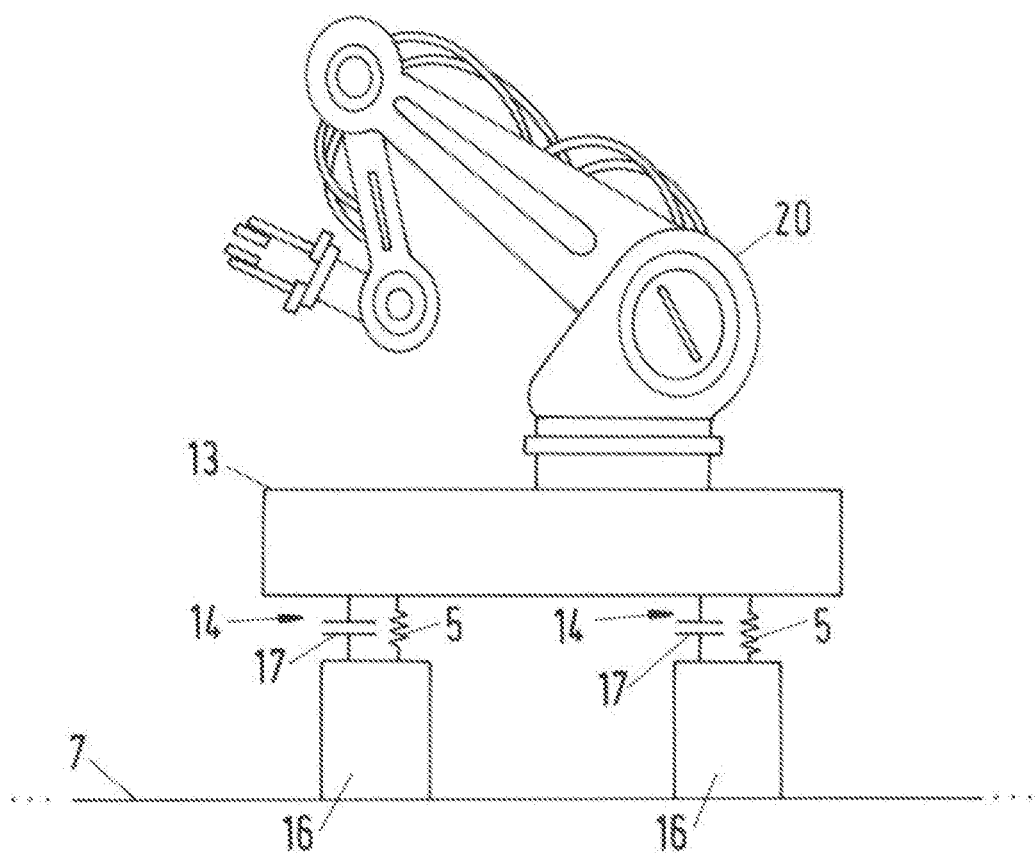
FIG. 7 shows a schematic side view of an apparatus including a positioning device according to a further exemplary embodiment of the disclosure.

FIG. 7 shows a schematic view of an apparatus 12 according to a further exemplary embodiment. In contrast to the exemplary embodiment shown in FIG. 3, the positioning device 2 is not embodied as a coordinate measuring device but as a robot 20, in particular as a so-called articulated robot.

Figure 8:
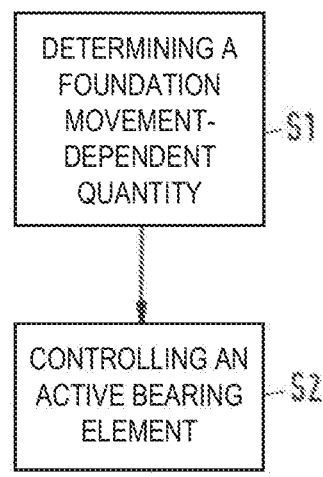
FIG. 8 shows a schematic flow chart of a method according to an exemplary embodiment of the disclosure.

FIG. 8 shows a schematic flowchart of a method for vibration isolation by one of the exemplary embodiments of the apparatus shown in FIGS. 2 to 7. A foundation movement-dependent quantity is determined in a first step S1, for example by the force sensors 16 shown in FIG. 2 or by differently embodied means for determining the foundation movement-dependent quantity. Further, an active bearing element 14 is controlled in a second step S2 on the basis of the foundation movement-dependent quantity by the control and evaluation device 15 in particular, in particular such that the movement of the base plate 13 caused by a foundation movement is reduced or eliminated.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

List of Reference Signs

1 Apparatus for vibration isolation according to the related art
2 Positioning device, coordinate measuring device
3 Base plate
4, 4a, 4b Passive damping element
5, 5a, 5b Passive spring element
6a, 6b Bearing element
7 Foundation
8 Sensor
9 Quill
10 Cross beam
11 Stand
12 Apparatus for vibration isolation
13 Base plate
14 Active bearing element
15 Control and evaluation device
16 Acceleration sensor
17 Actuator
18 Force sensor
19 Bearing portion
20 Articulated robot
S1 First step
S2 Second step
z Vertical axis
y Transverse axis

What is claimed is:

1. An apparatus for isolating a vibration of a positioning device, the apparatus comprising:
    a base plate for the positioning device;
    at least one active bearing element for bearing the base plate on/at a foundation, the at least one active bearing element including an actuator configured to produce a force;
    at least one means for determining a foundation movement-dependent quantity; and
    at least one evaluation and control device configured to control the at least one active bearing element such that a limit frequency of a vibration transfer behavior of the at least one active bearing element is set by setting the force produced by
    the at least one active bearing element being based on the foundation movement-dependent quantity.

2. The apparatus as claimed in claim 1, wherein the at least one active bearing element further comprises at least one of a spring element and a damping element.

3. The apparatus as claimed in claim 1, further comprising at least one of:
    at least one means for determining a base plate movement-dependent quantity, and
    at least one means for determining an inherent movement-dependent quantity of the positioning device, and
    wherein the at least one active bearing element is additionally controllable by the at least one evaluation and control device based on at least one of the base plate movement-dependent quantity and the inherent movement-dependent quantity of the positioning device.

4. The apparatus as claimed in claim 3, wherein the inherent movement-dependent quantity of the positioning device is determinable based on a model.

5. The apparatus as claimed in claim 1, wherein at least one of:
    a maximum producible force of the at least one active bearing element is larger than 100 N,
    a dynamical property is larger than 50 Hz, and
    a damping provided by the at least one active bearing element is larger than 50% for frequencies of less than 10 Hz.

6. The apparatus as claimed in claim 1, wherein the at least one active bearing element includes a piezo-actuator, an electromagnetic actuator, or a capacitive actuator.

7. The apparatus as claimed in claim 1, wherein the at least one active bearing element is additionally controllable by the at least one evaluation and control device based on at least one movement quantity of the positioning device.

8. The apparatus as claimed in claim 1, wherein the at least one active bearing element includes at least one position detection device.

9. The apparatus as claimed in claim 1, further comprising at least three active bearing elements.

10. An arrangement of the positioning device and the apparatus as claimed in claim 1, wherein the positioning device is mounted on or at the base plate of the apparatus.

11. A method for isolating the vibration of the positioning device by the apparatus as claimed in claim 1, the method comprising:
    determining the foundation movement-dependent quantity;
    controlling the at least one active bearing element based on the foundation movement-dependent quantity; and
    setting the limit frequency of the vibration transfer behavior of the at least one active bearing element by setting the force produced by the at least one active bearing element based on the foundation movement-dependent quantity.

* * * * *